United States Patent
Kakalec et al.

[19]

[11] Patent Number: 5,917,250
[45] Date of Patent: Jun. 29, 1999

[54] ISOLATION CIRCUIT AND VERIFICATION CONTROLLER FOR A POWER SUPPLY AND POWER PLANT EMPLOYING THE SAME

[75] Inventors: Robert J. Kakalec, Madison, N.J.; Vijayan J. Thottuvelil, Plano, Tex.

[73] Assignee: Lucent Technologies Inc., Murray Hill, N.J.

[21] Appl. No.: 08/946,621

[22] Filed: Oct. 7, 1997

[51] Int. Cl.[6] .................................................. H02J 9/06
[52] U.S. Cl. ........................... 307/18; 307/19; 307/64; 307/113; 307/130; 361/84
[58] Field of Search .................... 307/18, 19, 113, 307/112, 66, 64, 130, 86; 361/97, 84; 363/50; 320/165

[56] References Cited

U.S. PATENT DOCUMENTS

| | | | |
|---|---|---|---|
| 4,492,876 | 1/1985 | Colbert et al. | 307/66 |
| 4,659,942 | 4/1987 | Volp | 361/93 |
| 4,763,013 | 8/1988 | Gvoth et al. | 361/84 |
| 4,825,349 | 4/1989 | Marcel | 363/50 |
| 5,608,275 | 3/1997 | Khospowpour | 307/130 |

*Primary Examiner*—Albert W. Paladini

[57] ABSTRACT

An isolation circuit for use in a power plant having a first power supply that powers a first load and a second power supply that powers a second load. The first and second power supplies are cross-couplable via a first and second auxiliary path to allow the first power supply to power the second load and the second power supply to power the first load. The first power supply is subject to a reverse current by way of the first auxiliary path. The isolation circuit includes a first switch, located in the first auxiliary path, that substantially reduces the reverse current flowing into the first power supply thereby enhancing an isolation of the first power supply. A controller is, also, provided that monitors the first switch thereby enhancing a reliability of the power plant.

23 Claims, 4 Drawing Sheets

ISOLATION CIRCUIT AND VERIFICATION CONTROLLER FOR A POWER SUPPLY AND POWER PLANT EMPLOYING THE SAME

TECHNICAL FIELD OF THE INVENTION

The present invention is directed, in general, to power supplies and, more specifically, to an isolation circuit and verification controller for a power supply, a method of protecting and verifying an operation of a power supply and a power plant employing the same.

BACKGROUND OF THE INVENTION

The traditional reliability of telecommunication systems that users have come to expect and rely upon is based in part on the systems' operation on redundant equipment and power supplies. Telecommunication switching systems, for example, route tens of thousands of calls per second. The failure of such systems, due to either equipment breakdown or loss of power, is unacceptable since it would result in a loss of millions of telephone calls and a corresponding loss of revenue.

Power plants, such as battery plants, address the power loss problem by providing the system with a secondary source of power, a battery, in the event of the loss of a primary source of power to the system. Battery plants operate generally as follows. Each battery plant includes batteries, rectifiers, circuit breakers and other power distribution equipment (for a block diagram of a representative power plant, see FIG. 1). The primary power source is produced by the rectifiers, which convert an AC mains voltage into a DC voltage, to power the load and to charge the batteries. The primary power source may become unavailable due to the loss of the AC mains voltage or the failure of the rectifiers. In either case, the batteries then supply power to the load. The circuit breakers provide protection from excessive current conditions caused by short circuits or other malfunctions in the load. Redundant rectifiers and batteries may be added to the battery plant to reduce the probability of total battery plant failure. The addition of the redundant components, however, does not address the problem of single-point failures. Internal shorts or other failures in critical areas may still disable the entire battery plant.

Since some single-point failures may remove the entire battery plant from service (thereby nullifying its internal redundancies), many applications use independent, redundant battery plants to further improve the availability of power to vital equipment. One method, for instance, employs two redundant battery plants to independently power two redundant sets of load equipment, thereby providing a fully redundant system (see FIG. 2). The failure of one battery plant will not affect the other battery plant, which will continue to provide power to its load. The load equipment powered by the failed battery plant, however, is no longer available to provide redundancy capability.

For certain critical applications, it is desirable to improve availability even further. Critical applications may require the availability of both redundant sets of load equipment, even when one battery plant fails. One way of providing this capability is to connect the output of each of the battery plants to both loads after ensuring that either battery plant is independently capable of powering both loads. Consequently, if one battery plant fails, the remaining battery plant will provide power to both sets of load equipment, thereby maintaining full system redundancy.

One problem with this architecture is that a short in either battery plant or in the feeds may cause all the circuit breakers to open, resulting in a loss of power to both loads. The entire system would then become unavailable. Another problem occurs when the rectifiers in one battery plant fails or the AC input is lost. The remaining battery plant may then provide charging current to the batteries in the failed battery plant. A similar situation may occur when one of the battery plants is recovering from a full battery discharge and its battery voltage is low. In both situations, current would then flow from one battery plant to the other. Depending on the resistances in the distribution network, the currents could cause some or all of the circuit breakers to open, resulting again in a loss of power to both loads.

Accordingly, what is needed in the art is an architecture for providing high availability while maintaining the independence of the battery plants, such that the failure of one battery plant does not result in deleterious effects on the rest of the system. Further, to maintain high availability, what is needed in the art is a technique for determining if devices used in the high availability architecture have failed.

SUMMARY OF THE INVENTION

To address the above-discussed deficiencies of the prior art, the present invention provides an isolation circuit, and method, for use in a power plant having a first power supply that powers a first load and a second power supply that powers a second load. The first and second power supplies are cross-couplable via a first and second auxiliary path to allow the first power supply to power the second load and the second power supply to power the first load. The first power supply is subject to a reverse current by way of the first auxiliary path. The isolation circuit includes a first switch, located in the first auxiliary path, that substantially reduces the reverse current flowing into the first power supply thereby enhancing an isolation of the first power supply.

In a related, but alternative, embodiment, the second power supply is also subject to a reverse current by way of the second auxiliary path. The isolation circuit further includes a second switch, located in the second auxiliary path, that substantially reduces the reverse current flowing into the second power supply thereby enhancing an isolation of the second power supply.

The present invention effectively isolates a power supply from another power supply by substantially reducing reverse currents from flowing into the power supply from the other power supply or a cross-coupled load. The enhanced isolation is achieved by way of a switch that allows current to flow in only one direction in the auxiliary path. In highly critical applications, such as a telecommunications switching system, the highest level of protection from faults is necessary to maintain the integrity of the overall system. The present invention, therefore, protects the power supply (that powers the load) from potentially deleterious reverse currents thereby, ultimately, increasing the reliability of the overall system.

In an alternative embodiment, the present invention includes a controller that adjusts a differential potential across the first and second power supplies and measures a characteristic associated with the first switch thereby monitoring an operation of the first switch. In a related, but alternative, embodiment, the controller similarly monitors an operation of a second switch. The controller monitors the operation of the first or second switch without affecting the first or second load. The controller, therefore, may periodically test and monitor the switches while the system is operating thereby further enhancing a reliability of the system powered by the power supply. An alarm function, if desirable, may also be added.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
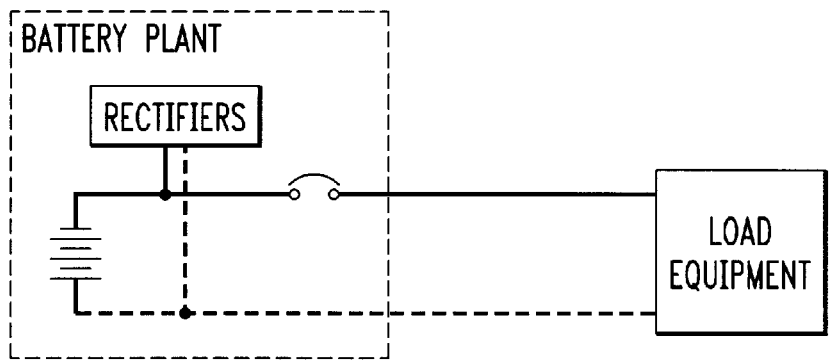
FIG. 1 illustrates a block diagram of a power plant.
Figure 2:
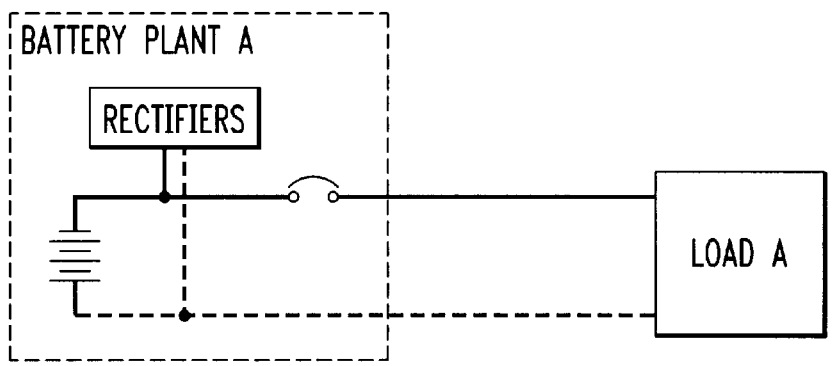
FIG. 2 illustrates a block diagram of a redundant power plant.
Figure 2:
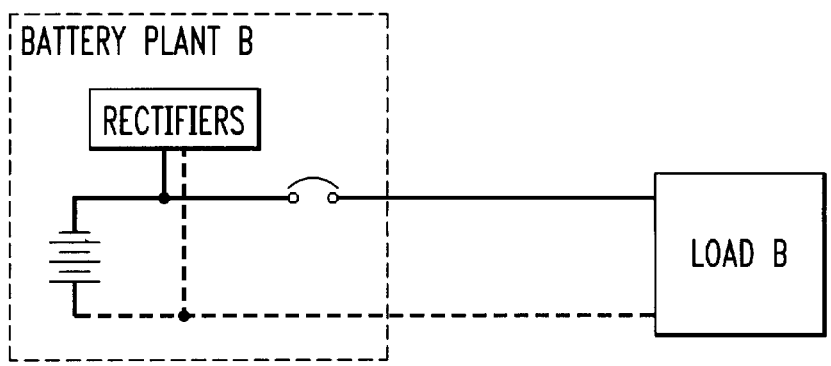
Figure 3:
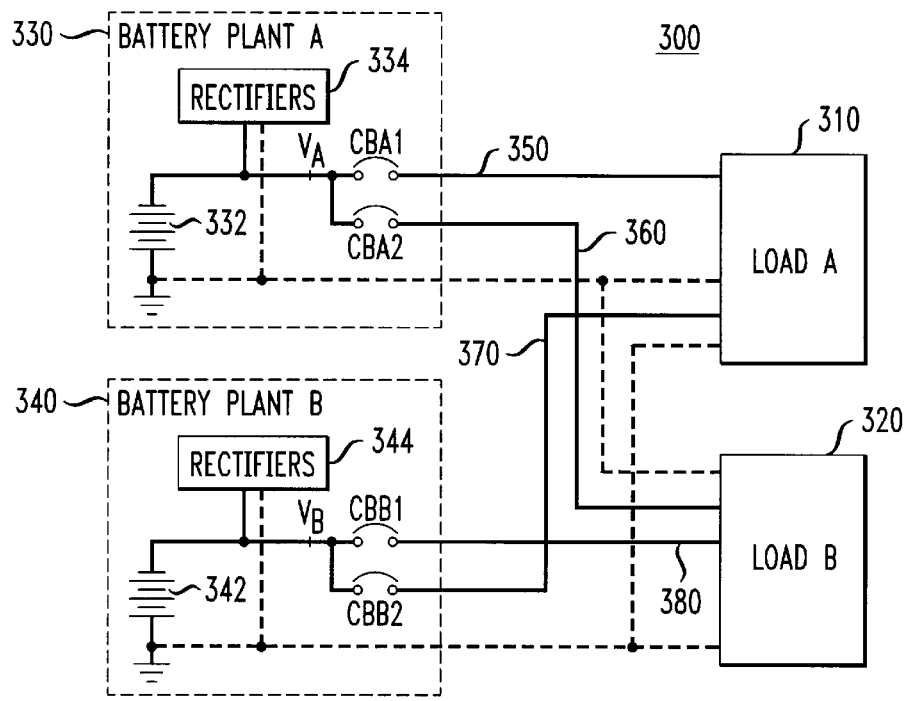
FIG. 3 illustrates a block diagram of a cross-coupled and redundant power plant.

Having previously introduced FIGS. 1 and 2, FIG. 3 illustrates a block diagram of a cross-coupled and redundant power plant 300. The power plant 300 includes a first load 310, a second load 320, a first power supply (battery plant A) 330 and a second power supply (battery plant B) 340. The first power supply 330 includes batteries 332 and rectifiers 334 coupled to a first main path circuit breaker CBA1 and a first auxiliary path circuit breaker CBA2; the first power supply 330 provides a first voltage $V_A$. The second power supply 340 similarly includes batteries 342 and rectifiers 344 coupled to a second main path circuit breaker CBB1 and a second auxiliary path circuit breaker CBB2; the second power supply 340 provides a second voltage $V_B$. The power plant 300 further includes a first main path 350 coupling the first main path circuit breaker CBA1 to the first load 310. The power plant 300 further includes a first auxiliary path 360 coupling the first auxiliary path circuit breaker CBA2 to the second load 320. The power plant 300 further includes a second main path 380 coupling the second main path circuit breaker CBB1 to the second load 320. The power plant 300 still further includes a second auxiliary path 370 coupling the second auxiliary path circuit breaker CBB2 to the first load 310.

The power plant 300 operates as follows. The cross-coupling of the first and second power supplies 330, 340 via the first and second main paths 350, 380 and the first and second auxiliary paths 360, 370 allow the first and second loads 310, 320 to be powered by either or both the first and second power supplies 330, 340. If, for instance, the first power supply 330 fails, the second power supply 340 may provide power to both the first and second loads 310, 320. Redundancy for powering the first and second loads 310, 320 is thereby maintained.

The cross-coupling of the first and second power supplies 330, 340 and the first and second loads 310, 320, however, may create a number of problems. If, for instance, the second voltage $V_B$ is lower than the first voltage $V_A$ due to a failure in the second power supply 340, reverse current from the first power supply 330 may then charge the second battery 342. Depending on the resistances of the first and second main and auxiliary paths, 350, 360, 370, 380, the resultant reverse current could cause the first and second main and auxiliary circuit breakers CBA1, CBA2, CBB1, CBB2 to open, resulting in a loss of power to either or both the first and second loads 310, 320. Additionally, a short in, for instance, the second power supply 340 or the second load 320, may cause all the circuit breakers CBA1, CBA2, CBB1, CBB2 to open. Both the first and second loads 310, 320 under these circumstances would then lose power.

The cross-coupling allows the first and second power supplies 330, 340 to power the first and second loads 310, 320 via the first and second auxiliary paths 360, 370. The auxiliary paths 360, 370 however, also link the first and second power supplies 330, 340 together, such that a failure in one power supply may affect another power supply.

Figure 4:
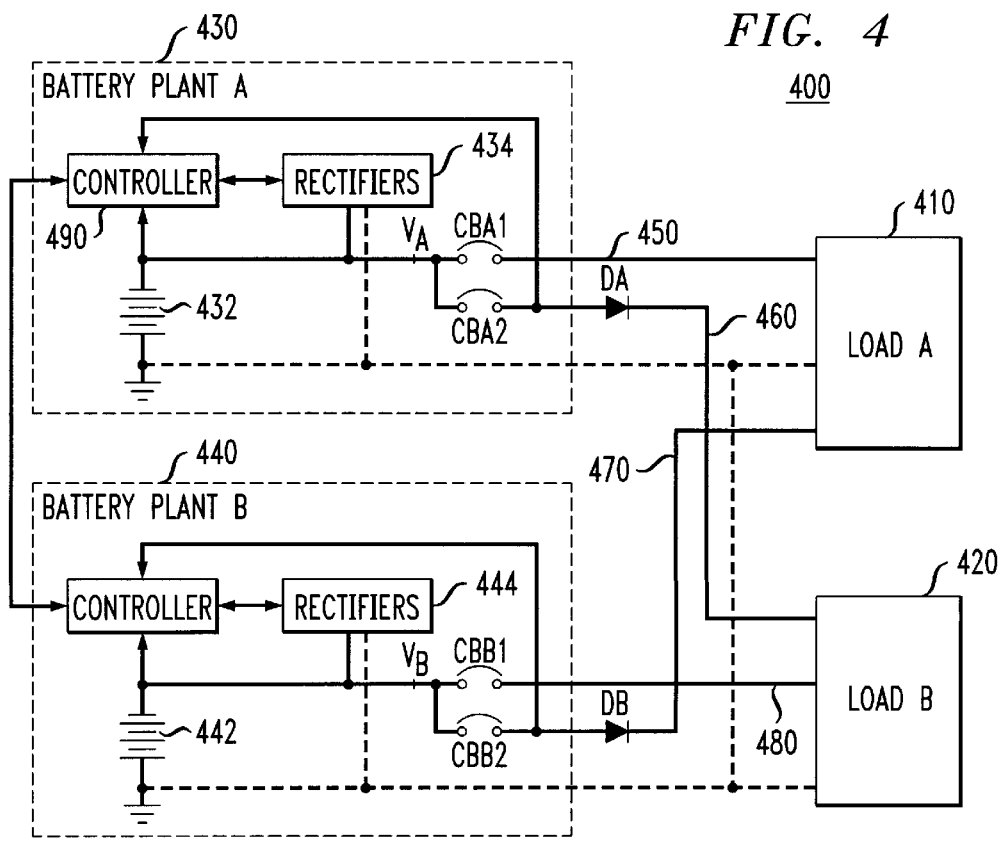
FIG. 4 illustrates a block diagram of an embodiment of a fully redundant high availability power plant constructed according to the principles of the present invention.

Turning now to FIG. 4, illustrated is a block diagram of an embodiment of a fully redundant high availability power plant 400 constructed according to the principles of the present invention. The power plant 400 includes a first load 410, a second load 420, a first power supply (battery plant A) 430 and a second power supply (battery plant B) 440. While this embodiment of the present invention employs battery plants, those skilled in the art will realize that the present invention is equally applicable to other types of power supplies.

The first power supply 430 includes batteries 432 and rectifiers 434 coupled to a first main path circuit breaker CBA1 and a first auxiliary path circuit breaker CBA2; the first power supply 430 provides a first voltage $V_A$. The second power supply 440 includes batteries 442 and rectifiers 444 coupled to a second main path circuit breaker CBB1 and a second auxiliary path circuit breaker CBB2; the second power supply 440 provides a second voltage $V_B$. While the illustrated embodiment contains circuit breakers, those skilled in the art will understand that, in general, any protective device (e.g., fuses) may be used.

The power plant 400 further includes a first diode or switch DA and a second diode or switch DB to substantially reduce the reverse current flowing into the first and second power supplies 430, 440. Those skilled in the art will realize however, that while this embodiment contains diodes, the use of any switch to reduce reverse current flowing in a power supply is within the broad scope of the present invention.

The power plant 400 further includes a first main path 450 coupling the first main path circuit breaker CBA1 to the first load 410. The power plant 400 further includes a first auxiliary path 460 coupling the first auxiliary path circuit breaker CBA2 to a first end of the first diode DA and coupling a second end of the first diode DA to the second load 420. The power plant 400 further includes a second main path 480 coupling the second main path circuit breaker CBB1 to the second load 420. The power plant 400 further includes a second auxiliary path 470 coupling the second auxiliary path circuit breaker CBB2 to a first end of the second diode DB and coupling a second end of the second diode DB to the first load 410. The power plant 400 still further includes controllers (one of which is designated 490) that monitors the operation of the power plant 400. The controller 490 is typically a microcontroller located in the power supplies 430, 440. Those skilled in the art, however, understand that any microprocessor-based system (such as a personal computer) may be employed as the controller 490 and that one controller can accommodate multiple power supplies 430, 440. The controller 490 controls the operation of the power plant 400 including adjusting a differential potential across the outputs of the power supplies 430, 440 and measuring a characteristic associated with the first and second diodes DA, DB to monitor an operation thereof. Those skilled in the art understand that a potential includes any characteristic (e.g., a voltage) associated with the power supply and, similarly, that characteristic includes any attribute (e.g., a current) associated with the diodes.

Ordinarily, both the first and second main paths 450, 480 and the first and second auxiliary paths 460, 470 carry current to the first and second loads 410, 420. The proportion of current supplied through each path is a function of the first and second voltages $V_A$, $V_B$, distributed resistances in the first and second main and auxiliary paths 450, 460, 470, 480 and the voltage drops associated with the first and second diodes DA, DB. Typically, the first and second auxiliary paths 460, 470, carry a significantly lower current than the first and second main paths 450, 480 because of the extra forward diode drop associated with the paths.

A failure in either the second main path 480 or the second power supply 440 results in the first power supply 430 supplying power to both the first load 410 and the second load 420. The first power supply 430 powers the first load 410 through the first main path 450. In addition, the first power supply powers the second load 420 through the first diode DA and the first auxiliary path 460. The second diode DB prevents or, at least, substantially reduces the reverse current from the first power supply 430 to the second power supply 440. The isolation of the first and second power supplies 430, 440 is thereby enhanced.

Similarly, a failure in the first main path 450 or the first power supply 430 results in the second power supply 440 providing power to the first load 410 through the second diode DB and the second auxiliary path 470 and to the second load 420 through the second main path 480. Here, the first diode DA prevents or substantially reduces the reverse current from the second power supply 440 to the first power supply 430.

The first diode DA also reduces current flow back from the second load 420 to the first power supply 430, thereby decreasing the possibility of a fault causing the first and second main and auxiliary circuit breakers CBA1, CBA2, CBB1, CBB2 to open. A fault in either the second power supply 440 or the second load 420 may cause the second main and auxiliary path circuit breakers CBB1, CBB2 in the second power supply to open, but may have minimal effect on the operation of either the first power supply 430 or the first load 410. The second diode DB likewise protects the second power supply 440 from reverse current conditions and other faults in either the first power supply 430 or the first load 410. The configuration of the first diode DA and the second diode DB, therefore, substantially isolates the first power supply 430 from the second power supply 440.

The continued operation of the first and second diodes DA, DB, in the first and second auxiliary paths 460, 470, is critical to maintaining the isolation of the first and second power supplies 430, 440. A diode can be easily tested, out of circuit, to determine whether it is operational. Once the diode is placed into the power plant 400, however, it becomes difficult to determine whether the diode remains operational. The diode may fail shorted, resulting in the loss of isolation of the redundant power supplies, or it may fail open, resulting in the loss of the auxiliary path. Therefore, to maintain very high availability, it is preferable to periodically determine whether the diode has failed, and if so, whether it is open or shorted. The usual method of detecting diode failure is to monitor the current and voltage across the diode. This method is not always optimal, however, because it requires that the diode be biased to different conditions to determine whether it has failed open or shorted.

Under typical operating conditions, the controller 490 maintains the first and second voltages $V_A$, $V_B$ at substantially equivalent potentials. The differential potential between the first and second voltages $V_A$, $V_B$ are periodically increased, however, to monitor the operation of the first and second diodes DA, DB. The adjustment of the first and second voltages are preferably performed in small increments. If one or more diodes are shorted, reverse currents may then be measured after each incremental voltage adjustment. This method thus avoids large reverse currents that may shut down the circuit breakers CBA1, CBA2, CBB1, CBB2, thereby disconnecting one or both battery plants 430, 440 from the first or second loads 410, 420.

Figure 5:
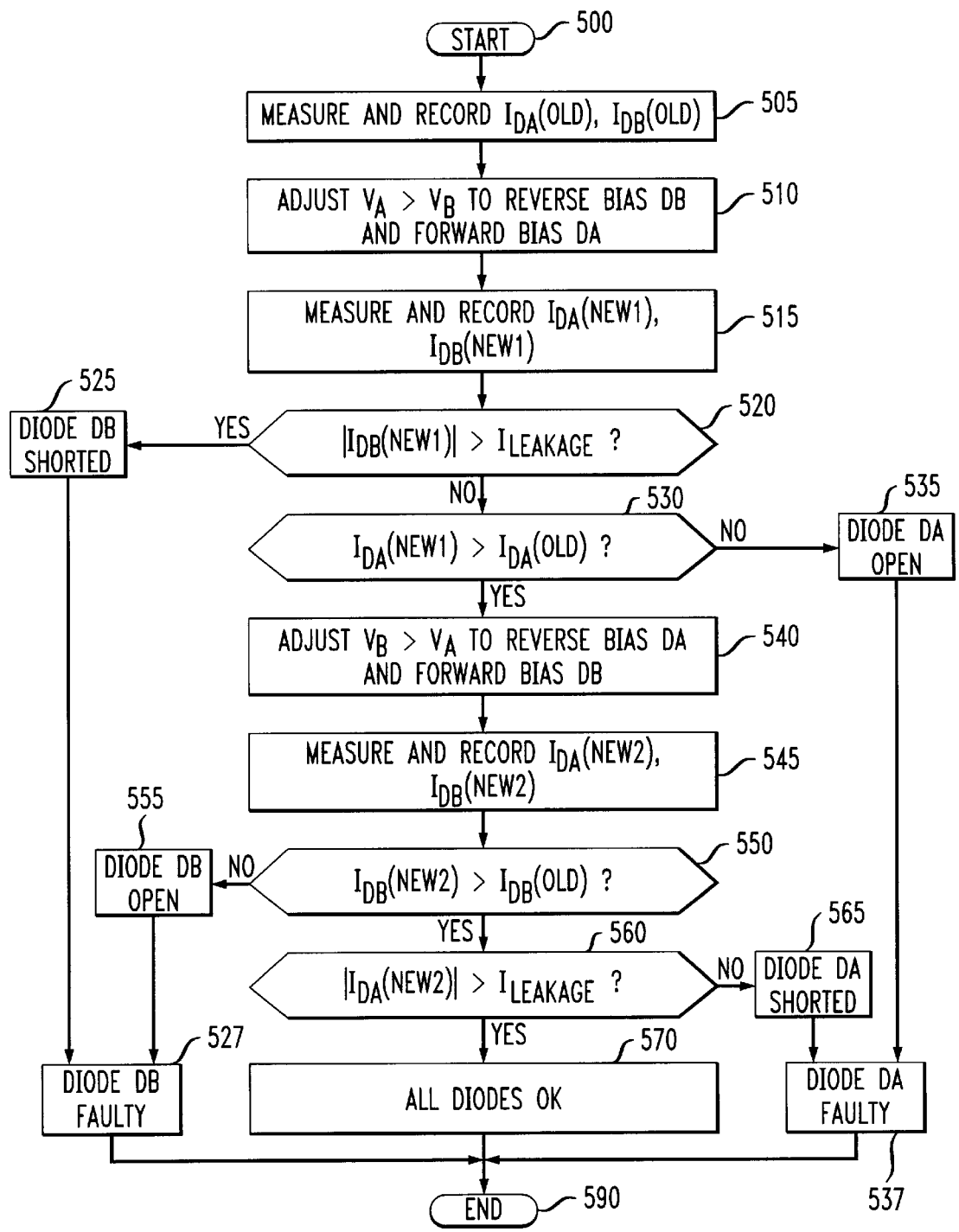
FIG. 5 illustrates a flow diagram of an exemplary method for operating the controller of FIG. 4.

Turning now to FIG. 5, illustrated is a flow diagram of an exemplary method for operating the controller 490 of FIG. 4. With continuing reference to FIG. 4, the controller 490 operates as follows. The method begins at a start step 500. At a first measurement step 505, the controller 490 measures and records initial first and second diode currents $I_{DA}$(old), $I_{DB}$(old) of the first and second diodes DA, DB, respectively. Next, at a first voltage adjustment step 510, first and second voltages $V_A$, $V_B$ are adjusted such that the first voltage $V_A$ is slightly greater than the second voltage $V_B$. The first diode DA is thus forward biased, while the second diode DB is reverse biased. Then, at a second measurement step 515, the controller 490 again measures and records intermediate first and second diode currents $I_{DA}$(new1), $I_{DB}$(new1). Then, at a first decisional step 520, the intermediate second diode current $I_{DB}$(new1) is examined. If the intermediate second diode current $I_{DB}$(new1) is greater than a leakage current $I_{LEAKAGE}$, then the second diode DB is shorted (see step 525). In such cases, the second diode DB is faulty (as depicted at a diode DB faulty step 527) and the method concludes at an end step 590.

If the second diode DB is not shorted, a second decisional step 530 compares the intermediate first diode current $I_{DA}$(new1) to the initial first diode current $I_{DA}$(old) previously measured in the first measurement step 505. If the intermediate first diode current $I_{DA}$(new1) is not greater than the initial first diode current $I_{DA}$(old), then the first diode DA is open (see step 535). In such cases, the first diode DA is faulty (as depicted at a diode DA faulty step 537) and the method concludes at the end step 590.

If the first diode DA is not open, the controller 490, at a second voltage adjustment step 540, readjusts the first and second voltages $V_A$, $V_B$ such that the second voltage $V_B$ is slightly greater than the first voltage $V_A$. The first diode DA is thus reverse biased, while the second diode DB is forward biased. Then, at a third measurement step 545, the controller 490 again measures and records final first and second diode currents $I_{DA}$(new2), $I_{DB}$(new2). A third decisional step 550 compares the final second diode current $I_{DB}$ (new2) to the initial second diode current $I_{DB}$ (old) previously measured in the first measurement step 505. If the final second diode current $I_{DB}$(new2) is not greater than the initial second diode current $I_{DB}$ (old), then the second diode DB is open (see step 555). In such cases, the second diode DB is faulty (as depicted at the diode DB faulty step 527) and the method concludes at the end step 590.

If the second diode DB is not open, the final first diode current $I_{DA}$ (new2) is then examined at a fourth decisional step 560. If the final first diode current $I_{DA}$(new2) is not greater than the leakage current $I_{LEAKAGE}$, then the first diode DA is shorted (see step 565). In such cases, the first diode DA is faulty (as depicted at the diode DA faulty step 537) and the method concludes at the end step 590. If none of the above decisional steps are taken, then both the first and second diodes DA, DB are functional (see step 570) and the method concludes at the end step 590.

Figure 6:
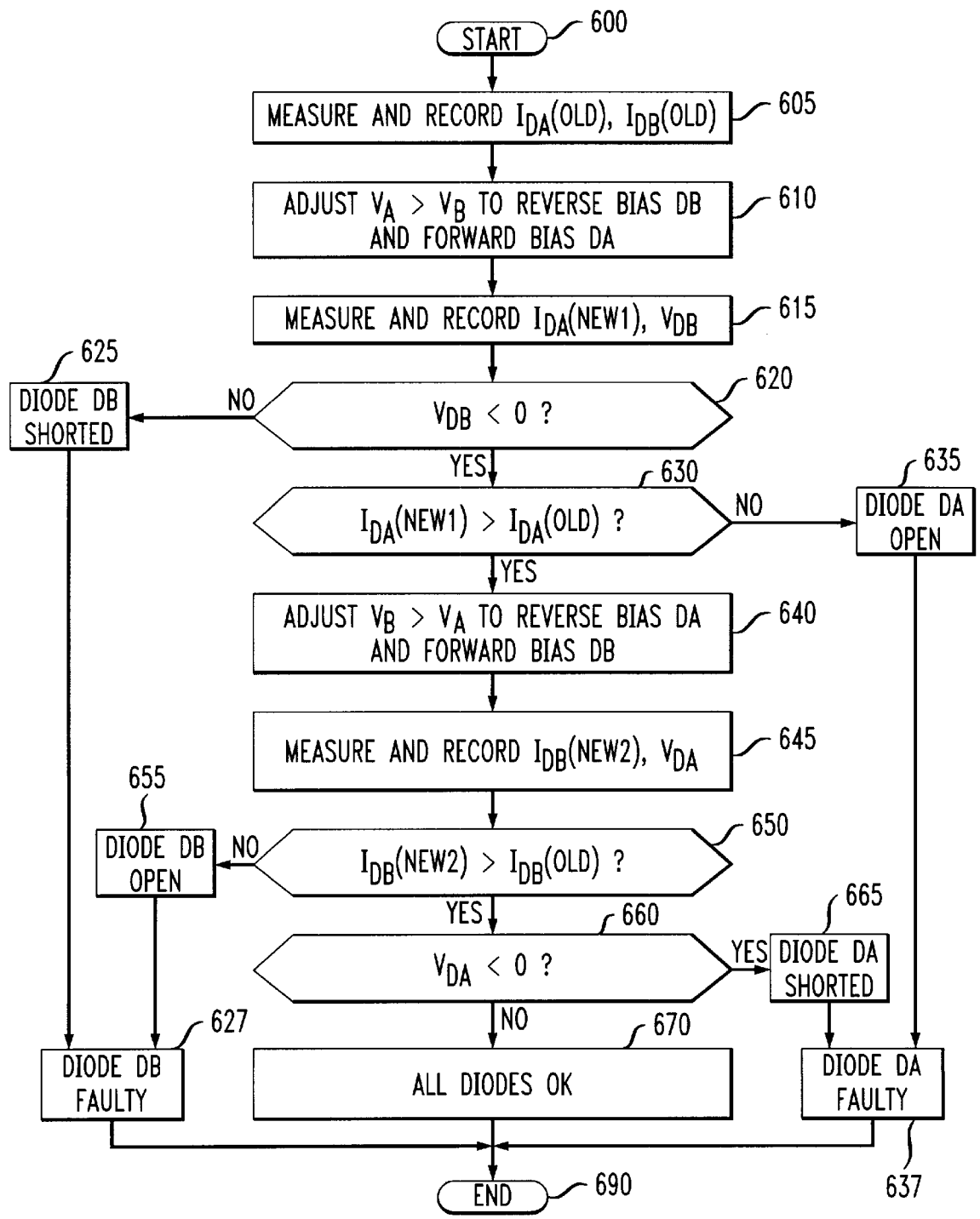
FIG. 6 illustrates a flow diagram of still another exemplary method for operating the controller of FIG. 4.

Turning now to FIG. 6, illustrated is a flow diagram of still another exemplary method for operating the controller 490 of FIG. 4. With continuing reference to FIG. 4, the controller 490 operates as follows. The method begins at a start step 600. At a first measurement step 605, the controller 490 measures and records initial first and second diode currents $I_{DA}$(old), $I_{DB}$(old) of the first and second diodes DA, DB, respectively. Next, at a first voltage adjustment step 610, first and second voltages $V_A$, $V_B$ are adjusted such that the first voltage $V_A$ is slightly greater than the second voltage $V_B$. The first diode DA is thus forward biased, while the second diode DB is reverse biased. Then, at a second measurement step 615, the controller 490 measures and records an intermediate first diode current $I_{DA}$(new1) and a second diode voltage $V_{DB}$. Then, at a first decisional step 620, the second diode voltage $V_{DB}$ is examined. If the second diode voltage $V_{DB}$ is not less than zero, then the second diode DB is shorted (see step 625). In such cases, the second diode DB is faulty (as depicted at a diode DB faulty step 627) and the method concludes at an end step 690.

If the second diode DB is not shorted, a second decisional step 630 compares the intermediate first diode current $I_{DA}$(new1) to the initial first diode current $I_{DA}$(old). If the intermediate first diode current $I_{DA}$(new1) is not greater than the initial first diode current $I_{DA}$(old), then the first diode DA is open (see step 635). In such cases, the first diode DA is faulty (as depicted at a diode DA faulty step 637) and the method concludes at the end step 690.

If the first diode DA is not open, the controller 490, at a second voltage adjustment step 640, readjusts the first and second voltages $V_A$, $V_B$ such that the second voltage $V_B$ is slightly greater than the first voltage $V_A$. The first diode DA is thus reverse biased, while the second diode DB is forward biased. Then, at a third measurement step 645, the controller 490 measures and records a final second diode current $I_{DB}$(new2) and a first diode voltage $V_{DA}$. A third decisional step 650 compares the final second diode current $I_{DB}$ (new2) to the initial second diode current $I_{DB}$(old). If the final second diode current $I_{DB}$(new2) is not greater than the initial second diode current $I_{DB}$(old), then the second diode DB is open (see step 655). In such cases, the second diode DB is faulty (as depicted at the diode DB faulty step 627) and the method concludes at the end step 690.

If the second diode DB is not open, the first diode voltage $V_{DA}$ is then examined at a fourth decisional step 660. If the first diode voltage $V_{DA}$ is less than zero, then the first diode DA is shorted (see step 665). In such cases, the first diode DA is faulty (as depicted at the diode DA faulty step 637) and the method concludes at the end step 690. If none of the above decisional steps are taken, then both the first and second diodes DA, DB are functional (see step 670) and the method concludes at the end step 690.

Therefore, by periodically adjusting the first and second voltages $V_A$, $V_B$, the first and second diodes DA, DB can be actively tested without affecting the first and second loads 410, 420, resulting in a redundant system with higher availability than previously possible.

While the previous embodiment of the present invention illustrates a power plant consisting of two power supplies and two loads, those skilled in the art will realize that the present invention is equally applicable to power plants containing a greater number of power supplies and/or loads.

Although the present invention has been described in detail, those skilled in the art should understand that they can make various changes, substitutions and alterations herein without departing from the spirit and scope of the invention in its broadest form.

What is claimed is:

1. For use in a power plant having a first power supply that powers a first load and a second power supply that powers a second load, said first and second power supply cross-couplable via a first and second auxiliary path to allow said first power supply to power said second load and said second power supply to power said first load, said first power supply subject to a reverse current by way of said first auxiliary path, an isolation circuit, comprising:

a first switch, located in said first auxiliary path, that substantially reduces said reverse current flowing into said first power supply thereby substantially isolating said first power supply; and a controller, coupled to said first and second power supplies, that adjusts a difference in potential between said first and second power supplies and measures a characteristic associated with said first switch thereby monitoring an operation of said first switch.

2. The circuit as recited in claim 1 wherein said second power supply is subject to a reverse current by way of said second auxiliary path, said isolation circuit, further comprising:

a second switch, located in said second auxiliary path, that substantially reduces said reverse current flowing into said second power supply thereby enhancing an isolation of said second power supply.

3. The circuit as recited in claim 1 wherein said first switch is a first diode and said second power supply is subject to a reverse current by way of said second auxiliary path, said isolation circuit, further comprising:

a second diode, located in said second auxiliary path, that substantially reduces said reverse current flowing into said second power supply thereby enhancing an isolation of said second power supply.

4. The circuit as recited in claim 1 wherein said first and second power supply each comprise a protective device coupled to said first load and said second load, respectively.

5. The circuit as recited in claim 1 wherein said first and second power supply each comprise a protective device coupled to said second load and said first load, respectively.

6. The circuit as recited in claim 1 wherein said first and second power supply each comprise a plurality of rectifiers.

7. For use in a power plant having a first power supply that powers a first load and a second power supply that powers a second load, said first and second power supply cross-couplable via a first and second auxiliary path to allow said first power supply to power said second load and said second power supply to power said first load, said first power supply subject to a reverse current by way of said first auxiliary path, a method of protecting said first power supply from said reverse current, comprising the steps of:

locating a first switch in said first auxiliary path;

substantially reducing said reverse current flowing into said first power supply thereby substantially isolating said first power supply;

adjusting a difference in potential between said first and second power supplies; and measuring a characteristic associated with said first switch to monitor an operation of said first switch.

8. The method as recited in claim 7 wherein said second power supply is subject to a reverse current by way of said second auxiliary path, the method further comprising the steps of:

locating a second switch in said second auxiliary path; and substantially reducing said reverse current flowing into said second power supply thereby enhancing an isolation of said second power supply.

9. The method as recited in claim 7 wherein said first switch is a first diode and said second power supply is subject to a reverse current by way of said second auxiliary path, the method further comprising the steps of:

locating a second diode in said second auxiliary path; and substantially reducing said reverse current flowing into said second power supply thereby enhancing an isolation of said second power supply.

10. The method as recited in claim 7 wherein said first and second power supply each comprise a protective device coupled to said first load and said second load, respectively.

11. The method as recited in claim 7 wherein said first and second power supply each comprise a protective device coupled to said second load and said first load, respectively.

12. The method as recited in claim 7 wherein said first and second power supply each comprise a plurality of rectifiers.

13. A power plant, comprising:

a first power supply that powers a first load through a first main path and a second load through a first auxiliary path;

a second power supply that powers said second load through a second main path and said first load through a second auxiliary path, said first power supply subject to a reverse current by way of said first auxiliary path, said second power supply subject to a reverse current by way of said second auxiliary path; and an isolation circuit, comprising:

a first switch, located in said first auxiliary path, that substantially reduces said reverse recovery current flowing into said first power supply thereby substantially isolating said first power supply;

a second switch, located in said second auxiliary path, that substantially reduces said reverse recovery current flowing into said second power supply thereby substantially isolating said first power supply; and a controller, coupled to said first and second power supplies, that adjusts a potential between said first and second power supplies and measures a characteristic associated with said first and second switch thereby monitoring an operation thereof.

14. The power plant as recited in claim 13 wherein said first switch is a first diode and said second switch is a second diode.

15. The power plant as recited in claim 13 wherein said first and second power supply each comprise a protective device coupled to said first load and said second load, respectively.

16. The power plant as recited in claim 13 wherein said first and second power supply each comprise a protective device coupled to said second load and said first load, respectively.

17. The power plant as recited in claim 13 wherein said power plant is a battery power plant and said first and second power supply each comprise a battery and a plurality of rectifiers.

18. For use in a power plant having a first power supply that powers a first load and a second power supply that powers a second load, said first and second power supply cross-couplable via a first and second auxiliary path to allow said first power supply to power said second load and said second power supply to power said first load, said first power supply subject to a reverse current by way of said first auxiliary path, a method of monitoring an operation of a first switch, located in said first auxilary path, that substantially reduces said reverse current flowing into said first power supply, comprising:

adjusting a first voltage of said first power supply relative to a second voltage of said second power supply to alter a characteristic of said first switch;

measuring said characteristic; and comparing said characteristic to a predetermined value to determine a failure mode of said first switch.

19. The method as recited in claim 18 said characteristic comprises a current.

20. The method as recited in claim 18 wherein said characteristic comprises a voltage.

21. The method as recited in claim 18 wherein said first switch is a diode, said characteristic comprises a current and said predetermined value representative of a leakage current of said diode.

22. The method as recited in claim 18 wherein said adjusting comprises increasing said first voltage relative to said second voltage.

23. The method as recited in claim 18 wherein said adjusting comprises decreasing said first voltage relative to said second voltage.

* * * * *